US010523787B2

(12) United States Patent
Laub et al.

(10) Patent No.: US 10,523,787 B2
(45) Date of Patent: *Dec. 31, 2019

(54) CONDUCTING INVESTIGATIONS UNDER LIMITED CONNECTIVITY

(71) Applicant: Palantir Technologies Inc., Palo Alto, CA (US)

(72) Inventors: Brian Laub, Washington, DC (US); Mark Scianna, Campbell, CA (US); Carter Kozak, Arlington, VA (US); Daniel Zangri, Palo Alto, CA (US); Izaak Baker, Palo Alto, CA (US); Joseph Henke, Arlington, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/023,286

(22) Filed: Jun. 29, 2018

(65) Prior Publication Data
US 2018/0309853 A1    Oct. 25, 2018

Related U.S. Application Data

(63) Continuation of application No. 15/383,812, filed on Dec. 19, 2016, now Pat. No. 10,044,836.

(51) Int. Cl.
*H04L 29/06* (2006.01)
*H04L 29/08* (2006.01)

(52) U.S. Cl.
CPC .......... *H04L 67/42* (2013.01); *H04L 67/1095* (2013.01); *H04L 67/28* (2013.01); *H04L 67/32* (2013.01)

(58) Field of Classification Search
CPC ..... H04L 67/42; H04L 67/32; H04L 67/1095; H04L 67/28
See application file for complete search history.

(56) References Cited

U.S. PATENT DOCUMENTS 4,881,179 A    11/1989 Vincent
5,241,625 A    8/1993 Epard et al.
(Continued)

FOREIGN PATENT DOCUMENTS

AU    2013251186    11/2015
CN    102054015    5/2014
(Continued)

OTHER PUBLICATIONS

"GrabUp—What a Timesaver!" <http://atlchris.com/191/grabup/>, Aug. 11, 2008, pp. 3.
(Continued)

*Primary Examiner* — Uzma Alam
(74) *Attorney, Agent, or Firm* — Sheppard Mullin Richter & Hampton LLP

(57) ABSTRACT

Systems and methods are provided for obtaining and providing one or more resources for an investigation to be conducted remotely from a server. Resources needed to conduct an investigation may include one or more portions of a database and/or one or more functionalities of a data analysis platform. Based on the investigation to be conducted (e.g., type of investigation, location of investigation, personnel involved, etc.), a computing system may obtain different amounts/types of resources from the server. The investigation may be conducted via a web application that runs on the computing system. The web application may access the resources obtained from the server. The results of the investigation may be sent by the computing system to the server. The computing system may receive updates from the server. The computing system may act as a server for other remote systems that are conducting investigations.

18 Claims, 6 Drawing Sheets

(56) References Cited

U.S. PATENT DOCUMENTS

| | | |
|---|---|---|
| 5,845,300 A | 12/1998 | Corner |
| 5,999,911 A | 12/1999 | Berg et al. |
| 6,065,026 A | 5/2000 | Cornelia et al. |
| 6,101,479 A | 8/2000 | Shaw |
| 6,232,971 B1 | 5/2001 | Haynes |
| 6,237,138 B1 | 5/2001 | Hameluck et al. |
| 6,243,706 B1 | 6/2001 | Moreau et al. |
| 6,279,018 B1 | 8/2001 | Kudrolli et al. |
| 6,370,538 B1 | 4/2002 | Lamping et al. |
| 6,430,305 B1 | 8/2002 | Decker |
| 6,523,019 B1 | 2/2003 | Borthwick |
| 6,642,945 B1 | 11/2003 | Sharpe |
| 6,665,683 B1 | 12/2003 | Meltzer |
| 6,850,317 B2 | 2/2005 | Mullins et al. |
| 6,944,777 B1 | 9/2005 | Belani et al. |
| 6,944,821 B1 | 9/2005 | Bates et al. |
| 6,967,589 B1 | 11/2005 | Peters |
| 6,978,419 B1 | 12/2005 | Kantrowitz |
| 7,086,028 B1 | 8/2006 | Davis et al. |
| 7,174,377 B2 | 2/2007 | Bernard et al. |
| 7,194,680 B1 | 3/2007 | Roy et al. |
| 7,213,030 B1 | 5/2007 | Jenkins |
| 7,286,836 B2 | 10/2007 | Emmerson et al. |
| 7,392,254 B1 | 6/2008 | Jenkins |
| 7,441,182 B2 | 10/2008 | Beilinson et al. |
| 7,441,219 B2 | 10/2008 | Perry et al. |
| 7,627,812 B2 | 12/2009 | Chamberlain et al. |
| 7,634,717 B2 | 12/2009 | Chamberlain et al. |
| 7,716,140 B1 | 5/2010 | Nielsen et al. |
| 7,765,489 B1 | 7/2010 | Shah |
| 7,770,100 B2 | 8/2010 | Chamberlain et al. |
| 7,814,234 B2 | 10/2010 | Hawkins et al. |
| 7,877,421 B2 | 1/2011 | Berger et al. |
| 7,880,921 B2 | 2/2011 | Dattilo et al. |
| 7,941,336 B1 | 5/2011 | Robin-Jan |
| 7,958,147 B1 | 6/2011 | Turner et al. |
| 7,962,848 B2 | 6/2011 | Bertram |
| 7,966,199 B1 | 6/2011 | Frasher |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,073,857 B2 | 12/2011 | Sreekanth |
| 8,191,005 B2 | 5/2012 | Baier et al. |
| 8,225,201 B2 | 7/2012 | Michael |
| 8,290,838 B1 | 10/2012 | Thakur et al. |
| 8,302,855 B2 | 11/2012 | Ma et al. |
| 8,312,367 B2 | 11/2012 | Foster |
| 8,392,556 B2 | 3/2013 | Goulet et al. |
| 8,527,949 B1 | 9/2013 | Pleis et al. |
| 8,620,641 B2 | 12/2013 | Farnsworth et al. |
| 8,682,696 B1 | 3/2014 | Shanmugam |
| 8,688,573 B1 | 4/2014 | Ruknoic et al. |
| 8,732,574 B2 | 5/2014 | Burr et al. |
| 8,745,174 B2 | 6/2014 | Bryan et al. |
| 8,799,313 B2 | 8/2014 | Satlow |
| 8,807,948 B2 | 8/2014 | Luo et al. |
| 8,930,874 B2 | 1/2015 | Duff et al. |
| 8,935,620 B1* | 1/2015 | Cox .................... G06F 3/0483 |
| | | 709/203 |
| 8,938,686 B1 | 1/2015 | Erenrich et al. |
| 8,984,390 B2 | 3/2015 | Aymeloglu et al. |
| 9,021,026 B2 | 4/2015 | Hopkins et al. |
| 9,058,315 B2 | 6/2015 | Burr et al. |
| 9,165,100 B2 | 10/2015 | Begur et al. |
| 9,286,373 B2 | 3/2016 | Elliot et al. |
| 9,300,534 B2 | 3/2016 | Hopkins |
| 9,348,880 B1 | 5/2016 | Kramer et al. |
| 9,363,335 B2 | 6/2016 | Han et al. |
| 10,044,836 B2 | 8/2018 | Laub et al. |
| 2001/0021936 A1 | 9/2001 | Bertram |
| 2002/0032677 A1 | 3/2002 | Morgenthaler et al. |
| 2002/0095360 A1 | 7/2002 | Joao |
| 2002/0103705 A1 | 8/2002 | Brady |
| 2002/0196229 A1 | 12/2002 | Chen et al. |
| 2003/0028560 A1 | 2/2003 | Kudrolli et al. |
| 2003/0036927 A1 | 2/2003 | Bowen |
| 2003/0055927 A1 | 3/2003 | Fischer et al. |
| 2003/0056206 A1 | 3/2003 | Engo |
| 2003/0061132 A1 | 3/2003 | Mason et al. |
| 2003/0093755 A1 | 5/2003 | O'Carroll |
| 2003/0126102 A1 | 7/2003 | Borthwick |
| 2004/0034570 A1 | 2/2004 | Davis |
| 2004/0044648 A1 | 3/2004 | Anfindsen et al. |
| 2004/0078451 A1 | 4/2004 | Dietz et al. |
| 2004/0157641 A1 | 8/2004 | Chithambaram et al. |
| 2004/0205492 A1 | 10/2004 | Newsome |
| 2004/0236688 A1 | 11/2004 | Bozeman |
| 2004/0236711 A1 | 11/2004 | Nixon et al. |
| 2005/0010472 A1 | 1/2005 | Quatse et al. |
| 2005/0028094 A1 | 2/2005 | Allyn |
| 2005/0039116 A1 | 2/2005 | Slack-Smith |
| 2005/0091186 A1 | 4/2005 | Elish |
| 2005/0125715 A1 | 6/2005 | Di Franco et al. |
| 2005/0235012 A1 | 10/2005 | Harry et al. |
| 2006/0004927 A1 | 1/2006 | Rehman et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0069704 A1 | 3/2006 | Breeden et al. |
| 2006/0074866 A1 | 4/2006 | Chamberlain et al. |
| 2006/0080139 A1 | 4/2006 | Mainzer |
| 2006/0129746 A1 | 6/2006 | Porter |
| 2006/0136513 A1 | 6/2006 | Ngo et al. |
| 2006/0143075 A1 | 6/2006 | Carr et al. |
| 2006/0155654 A1 | 7/2006 | Plessis et al. |
| 2006/0178915 A1 | 8/2006 | Chao |
| 2006/0265417 A1 | 11/2006 | Amato et al. |
| 2006/0277460 A1 | 12/2006 | Forstall et al. |
| 2007/0000999 A1 | 1/2007 | Kubo et al. |
| 2007/0016676 A1 | 1/2007 | Breuer et al. |
| 2007/0018986 A1 | 1/2007 | Hauser |
| 2007/0043686 A1 | 2/2007 | Teng et al. |
| 2007/0061752 A1 | 3/2007 | Cory |
| 2007/0113164 A1 | 5/2007 | Hansen et al. |
| 2007/0136095 A1 | 6/2007 | Weinstein |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0245339 A1 | 10/2007 | Bauman et al. |
| 2007/0284433 A1 | 12/2007 | Domenica et al. |
| 2007/0299697 A1 | 12/2007 | Friedlander et al. |
| 2008/0016155 A1 | 1/2008 | Khalatian |
| 2008/0086540 A1* | 4/2008 | Scott .................... H04L 67/2861 |
| | | 709/217 |
| 2008/0091693 A1 | 4/2008 | Murthy |
| 2008/0109714 A1 | 5/2008 | Kumar et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0249820 A1 | 10/2008 | Pathria |
| 2008/0276167 A1 | 11/2008 | Michael |
| 2008/0288475 A1 | 11/2008 | Kim et al. |
| 2008/0313132 A1 | 12/2008 | Hao et al. |
| 2008/0313243 A1 | 12/2008 | Poston et al. |
| 2009/0024962 A1 | 1/2009 | Gotz |
| 2009/0031401 A1 | 1/2009 | Cudich et al. |
| 2009/0043801 A1 | 2/2009 | LeClair |
| 2009/0089651 A1 | 4/2009 | Herberger et al. |
| 2009/0106178 A1 | 4/2009 | Chu |
| 2009/0112678 A1 | 4/2009 | Luzardo |
| 2009/0112745 A1 | 4/2009 | Stefanescu |
| 2009/0150868 A1 | 6/2009 | Chakra et al. |
| 2009/0164934 A1 | 6/2009 | Bhattiprolu et al. |
| 2009/0177962 A1 | 7/2009 | Gusmorino et al. |
| 2009/0187546 A1 | 7/2009 | Whyte et al. |
| 2009/0199106 A1 | 8/2009 | Jonsson et al. |
| 2009/0216562 A1 | 8/2009 | Faulkner et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0271343 A1 | 10/2009 | Vaiciulis et al. |

(56) References Cited

U.S. PATENT DOCUMENTS

| | | |
|---|---|---|
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0307049 A1 | 12/2009 | Elliott et al. |
| 2009/0313463 A1 | 12/2009 | Pang et al. |
| 2009/0319891 A1 | 12/2009 | MacKinlay |
| 2010/0004857 A1 | 1/2010 | Pereira et al. |
| 2010/0057622 A1 | 3/2010 | Faith et al. |
| 2010/0070842 A1 | 3/2010 | Aymeloglu et al. |
| 2010/0070844 A1 | 3/2010 | Aymeloglu et al. |
| 2010/0076813 A1 | 3/2010 | Ghosh et al. |
| 2010/0098318 A1 | 4/2010 | Anderson |
| 2010/0122152 A1 | 5/2010 | Chamberlain et al. |
| 2010/0223260 A1 | 9/2010 | Wu |
| 2010/0238174 A1 | 9/2010 | Haub et al. |
| 2010/0262901 A1 | 10/2010 | DiSalvo |
| 2010/0280851 A1 | 11/2010 | Merkin |
| 2010/0306722 A1 | 12/2010 | LeHoty et al. |
| 2010/0313239 A1 | 12/2010 | Chakra et al. |
| 2011/0047540 A1 | 2/2011 | Williams et al. |
| 2011/0074788 A1 | 3/2011 | Regan et al. |
| 2011/0093327 A1 | 4/2011 | Fordyce, III et al. |
| 2011/0099133 A1 | 4/2011 | Chang et al. |
| 2011/0107196 A1 | 5/2011 | Foster |
| 2011/0161409 A1 | 6/2011 | Nair |
| 2011/0173093 A1 | 7/2011 | Psota et al. |
| 2011/0179048 A1 | 7/2011 | Satlow |
| 2011/0208565 A1 | 8/2011 | Ross et al. |
| 2011/0225482 A1 | 9/2011 | Chan et al. |
| 2012/0004894 A1 | 1/2012 | Butler |
| 2012/0022945 A1 | 1/2012 | Falkenborg et al. |
| 2012/0059853 A1 | 3/2012 | Jagota |
| 2012/0065987 A1 | 3/2012 | Farooq et al. |
| 2012/0084117 A1 | 4/2012 | Tavares et al. |
| 2012/0084184 A1 | 4/2012 | Raleigh |
| 2012/0123989 A1 | 5/2012 | Yu et al. |
| 2012/0188252 A1 | 7/2012 | Law |
| 2012/0197657 A1 | 8/2012 | Prodanovic |
| 2012/0197660 A1 | 8/2012 | Prodanovic |
| 2012/0215784 A1 | 8/2012 | King et al. |
| 2012/0226590 A1 | 9/2012 | Love et al. |
| 2012/0266245 A1 | 10/2012 | McDougal et al. |
| 2012/0284670 A1 | 11/2012 | Kashik et al. |
| 2012/0304244 A1 | 11/2012 | Xie et al. |
| 2012/0323829 A1 | 12/2012 | Stokes et al. |
| 2013/0016106 A1 | 1/2013 | Yip et al. |
| 2013/0055264 A1 | 2/2013 | Burr et al. |
| 2013/0097482 A1 | 4/2013 | Marantz et al. |
| 2013/0124567 A1 | 5/2013 | Balinsky et al. |
| 2013/0151305 A1 | 6/2013 | Akinola et al. |
| 2013/0151453 A1 | 6/2013 | Bhanot et al. |
| 2013/0166480 A1 | 6/2013 | Popescu et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0288719 A1 | 10/2013 | Alonzo |
| 2014/0089339 A1 | 3/2014 | Siddiqui et al. |
| 2014/0129936 A1 | 5/2014 | Richards et al. |
| 2014/0208281 A1 | 7/2014 | Ming |
| 2014/0222793 A1 | 8/2014 | Sadkin et al. |
| 2014/0244284 A1 | 8/2014 | Smith |
| 2014/0358829 A1 | 12/2014 | Hurwitz |
| 2015/0026622 A1 | 1/2015 | Roaldson et al. |
| 2015/0073954 A1 | 3/2015 | Braff |
| 2015/0089353 A1 | 3/2015 | Folkening |
| 2015/0100907 A1 | 4/2015 | Erenrich et al. |
| 2015/0106379 A1 | 4/2015 | Elliot et al. |
| 2015/0186483 A1 | 7/2015 | Tappan et al. |
| 2015/0212663 A1 | 7/2015 | Papale et al. |
| 2015/0254220 A1 | 9/2015 | Burr et al. |
| 2016/0062555 A1 | 3/2016 | Ward et al. |
| 2016/0094497 A1* | 3/2016 | Javed .................... G06F 16/95 709/206 |
| 2016/0098176 A1 | 4/2016 | Cervelli et al. |
| 2016/0110369 A1 | 4/2016 | Cervelli et al. |
| 2016/0162519 A1 | 6/2016 | Stowe et al. |
| 2016/0226871 A1* | 8/2016 | Stephure ................ H04L 67/02 |
| 2017/0006113 A1 | 1/2017 | Singhal |
| 2018/0176336 A1 | 6/2018 | Laub et al. |

FOREIGN PATENT DOCUMENTS

| | | |
|---|---|---|
| EP | 1672527 | 6/2006 |
| EP | 2993595 | 3/2016 |
| EP | 3002691 | 4/2016 |
| EP | 3009943 | 4/2016 |
| EP | 3032441 | 6/2016 |
| WO | WO 01/025906 | 4/2001 |
| WO | WO 2001/088750 | 11/2001 |
| WO | WO 2007/133206 | 11/2007 |
| WO | WO 2010/030913 | 3/2010 |
| WO | WO 2010/030914 | 3/2010 |
| WO | WO 2012/119008 | 9/2012 |

OTHER PUBLICATIONS

"Remove a Published Document or Blog Post," Sharing and Collaborating on Blog Post.

Abbey, Kristen, "Review of Google Docs," May 1, 2007, pp. 2.

Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.

Bluttman et al., "Excel Formulas and Functions for Dummies," 2005, Wiley Publishing, Inc., pp. 280, 284-286.

Chaudhuri et al., "An Overview of Business Intelligence Technology," Communications of the ACM, Aug. 2011, vol. 54, No. 8.

Conner, Nancy, "Google Apps: The Missing Manual," May 1, 2008, pp. 15.

Ferreira et al., "A Scheme for Analyzing Electronic Payment Systems," Basil 1997.

Galliford, Miles, "SnagIt Versus Free Screen Capture Software: Critical Tools for Website Owners," <http://www.subhub.com/articles/free-screen-capture-software>, Mar. 27, 2008, pp. 11.

Gu et al., "Record Linkage: Current Practice and Future Directions," Jan. 15, 2004, pp. 32.

Hua et al., "A Multi-attribute Data Structure with Parallel Bloom Filters for Network Services", HiPC 2006, LNCS 4297, pp. 277-288, 2006.

JetScreenshot.com, "Share Screenshots via Internet in Seconds," <http://web.archive.org/web/20130807164204/http://www.jetscreenshot.com/>, Aug. 7, 2013, pp. 1.

Kwout, <http://web.archive.org/web/20080905132448/http://www.kwout.com/> Sep. 5, 2008, pp. 2.

Microsoft Windows, "Microsoft Windows Version 2002 Print Out 2," 2002, pp. 1-6.

Microsoft, "Registering an Application to a URI Scheme," <http://msdn.microsoft.com/en-us/library/aa767914.aspx>, printed Apr. 4, 2009 in 4 pages.

Microsoft, "Using the Clipboard," <http://msdn.microsoft.com/en-us/library/ms649016.aspx>, printed Jun. 8, 2009 in 20 pages.

Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.

Notice of Acceptance for Australian Patent Application No. 2013251186 dated Nov. 6, 2015.

Notice of Allowance for U.S. Appl. No. 12/556,318 dated Apr. 11, 2016.

Notice of Allowance for U.S. Appl. No. 14/192,767 dated Apr. 20, 2015.

Notice of Allowance for U.S. Appl. No. 14/265,637 dated Feb. 13, 2015.

Notice of Allowance for U.S. Appl. No. 14/552,336 dated Nov. 3, 2015.

Notice of Allowance for U.S. Appl. No. 14/676,621 dated Feb. 10, 2016.

Notice of Allowance for U.S. Appl. No. 14/961,481 dated May 2, 2016.

(56) References Cited

OTHER PUBLICATIONS

Official Communication for Australian Patent Application No. 2013251186 dated Mar. 12, 2015.
Official Communication for Canadian Patent Application No. 2831660 dated Jun. 9, 2015.
Official Communication for European Patent Application No. 12181585.6 dated Sep. 4, 2015.
Official Communication for European Patent Application No. 14189344.6 dated Feb. 29, 2016.
Official Communication for European Patent Application No. 15188106.7 dated Feb. 3, 2016.
Official Communication for European Patent Application No. 15190307.7 dated Feb. 19, 2016.
Official Communication for Great Britain Patent Application No. 1404499.4 dated Aug. 20, 2014.
Official Communication for Great Britain Patent Application No. 1404489.5 dated Aug. 27, 2014.
Official Communication for Great Britain Patent Application No. 1404486.1 dated Aug. 27, 2014.
Official Communication for Netherlands Patent Application No. 2011729 dated Aug. 13, 2015.
Official Communication for Netherlands Patent Application No. 2012438 dated Sep. 21, 2015.
Official Communication for New Zealand Patent Application No. 622473 dated Mar. 27, 2014.
Official Communication for New Zealand Patent Application No. 622473 dated Jun. 19, 2014.
Official Communication for New Zealand Patent Application No. 628161 dated Aug. 25, 2014.
Official Communication for U.S. Appl. No. 14/473,860 dated Nov. 4, 2014.
Official Communication for U.S. Appl. No. 12/556,321 dated Jul. 7, 2015.
Official Communication for U.S. Appl. No. 12/556,321 dated Feb. 25, 2016.
Official Communication for U.S. Appl. No. 12/556,321 dated Jun. 6, 2012.
Official Communication for U.S. Appl. No. 12/556,321 dated Dec. 7, 2011.
Official Communication for U.S. Appl. No. 13/669,274 dated Aug. 26, 2015.
Official Communication for U.S. Appl. No. 13/669,274 dated May 6, 2015.
Official Communication for U.S. Appl. No. 13/669,274 dated May 2, 2016.
Official Communication for U.S. Appl. No. 13/827,491 dated Oct. 9, 2015.
Official Communication for U.S. Appl. No. 13/827,491 dated Jun. 22, 2015.
Official Communication for U.S. Appl. No. 14/102,394 dated Mar. 27, 2014.
Official Communication for U.S. Appl. No. 14/108,187 dated Mar. 20, 2014.
Official Communication for U.S. Appl. No. 14/108,187 dated Apr. 17, 2014.
Official Communication for U.S. Appl. No. 14/135,289 dated Apr. 16, 2014.
Official Communication for U.S. Appl. No. 14/135,289 dated Jul. 7, 2014.
Official Communication for U.S. Appl. No. 14/192,767 dated May 6, 2014.
Official Communication for U.S. Appl. No. 14/192,767 dated Sep. 24, 2014.
Official Communication for U.S. Appl. No. 14/196,814 dated Aug. 13, 2014.
Official Communication for U.S. Appl. No. 14/222,364 dated Dec. 9, 2015.
Official Communication for U.S. Appl. No. 14/225,006 dated Sep. 2, 2015.
Official Communication for U.S. Appl. No. 14/265,637 dated Sep. 26, 2014.
Official Communication for U.S. Appl. No. 14/268,964 dated Jul. 11, 2014.
Official Communication for U.S. Appl. No. 14/289,596 dated Aug. 5, 2015.
Official Communication for U.S. Appl. No. 14/332,306 dated May 20, 2016.
Official Communication for U.S. Appl. No. 14/479,160 dated Apr. 20, 2016.
Official Communication for U.S. Appl. No. 14/552,336 dated Jul. 20, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/715,834 dated Feb. 19, 2016.
Official Communication for U.S. Appl. No. 14/715,834 dated Apr. 13, 2016.
Official Communication for U.S. Appl. No. 14/715,834 dated Jun. 28, 2016.
Official Communication for U.S. Appl. No. 14/741,256 dated Feb. 9, 2016.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/800,447 dated Jun. 6, 2016.
Official Communication for U.S. Appl. No. 14/841,338 dated Feb. 18, 2016.
Official Communication for U.S. Appl. No. 14/842,734 dated Nov. 19, 2015.
Official Communication for U.S. Appl. No. 14/871,465 dated Feb. 9, 2016.
Official Communication for U.S. Appl. No. 14/871,465 dated Apr. 11, 2016.
Official Communication for U.S. Appl. No. 14/883,498 dated Dec. 24, 2015.
Official Communication for U.S. Appl. No. 14/883,498 dated Mar. 17, 2016.
Official Communication for U.S. Appl. No. 14/961,481 dated Mar. 2, 2016.
Official Communication for U.S. Appl. No. 14/975,215 dated May 19, 2016.
Official Communication for U.S. Appl. No. 15/383,812 dated Jun. 22, 2017.
Official Communication for U.S. Appl. No. 15/383,812 dated Nov. 29, 2017.
Official Communication for U.S. Appl. No. 15/383,812 dated Mar. 28, 2018.
Online Tech Tips, "Clip2Net—Share files, folders and screenshots easily," <http://www.online-tech-tips.com/free-software-downloads/share-files-folders-screenshots/>, Apr. 2, 2008, pp. 5.
O'Reilly.com, http://oreilly.com/digitalmedia/2006/01/01/mac-os-x-screenshot-secrets.html published Jan. 1, 2006 in 10 pages.
Schroder, Stan, "15 Ways to Create Website Screenshots," <http://mashable.com/2007/08/24/web-screenshots/>, Aug. 24, 2007, pp. 2.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
Wang et al., "Research on a Clustering Data De-Duplication Mechanism Based on Bloom Filter," IEEE 2010, 5 pages.

(56) References Cited

OTHER PUBLICATIONS

Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.

* cited by examiner

CONDUCTING INVESTIGATIONS UNDER LIMITED CONNECTIVITY

CROSS REFERENCE TO RELATED APPLICATIONS

This application is a continuation of U.S. patent application Ser. No. 15/383,812, filed on Dec. 19, 2016, the disclosures of which are expressly incorporated herein by reference in their entirety.

FIELD OF THE INVENTION

This disclosure relates to approaches for conducting investigations while having limited network connectivity with a server.

BACKGROUND

Under conventional approaches, a client application for conducting investigations may be deployed on a mobile device. The client application may need to access resources hosted on a server to conduct the investigation. If the connection between the client application and the server is lost or poor, the user may be unable to obtain the resources necessary to conduct the investigation. As a result, a user's ability to conduct the investigation may be limited by the availability of sufficient connection/bandwidth between the client application and the server.

SUMMARY

Various embodiments of the present disclosure may include systems, methods, and non-transitory computer readable media configured to facilitate conducting investigations while having limited network connectivity with a server. A server has access to resources required by an investigation application to facilitate an investigation by one or more users. Various embodiments of the present disclosure may include systems, methods, and non-transitory computer readable media configured to receive from the server one or more resources for the investigation to be performed remotely from the server; and providing one or more resources to the investigation application that facilitates the investigation. One or more provided resources enable the investigation application to facilitate the investigation without an active connection to the server.

In some embodiments, one or more resources include one or more subsets of one or more databases accessed by the server. In some embodiments, one or more resources include one or more functionalities for the investigation application.

In some embodiments, the investigation application is executed by the system. In some embodiments, the investigation application is executed on a computing device remote from the system.

In some embodiments, the systems, methods, and non-transitory computer readable media are configured to receive one or more updates for one or more resources from the server.

In some embodiments, the systems, methods, and non-transitory computer readable media are configured to send a result of the investigation to the server. The results of the investigation may be received by the system from the computing device remote from the system.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
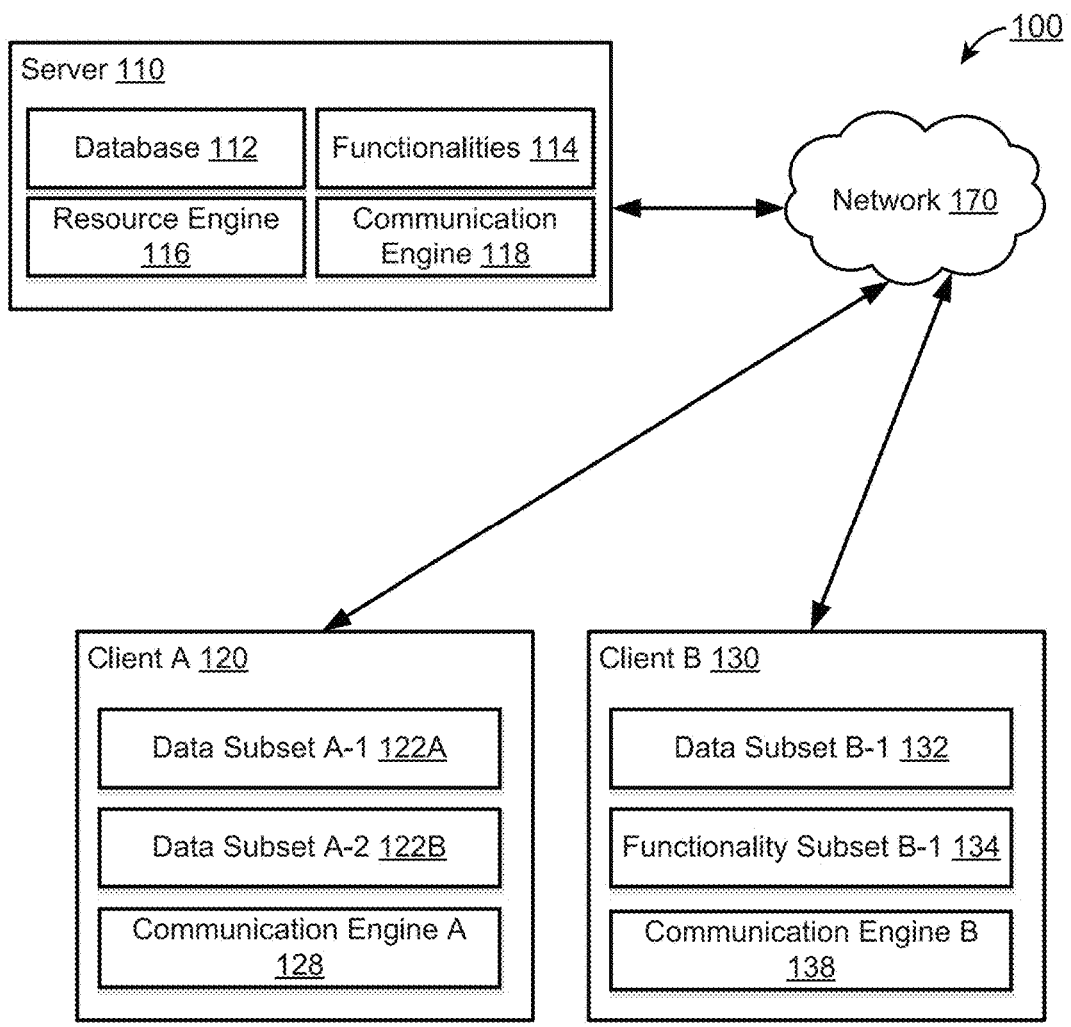
FIGS. 1-3 illustrate example environments for conducting investigations while having limited network connectivity with a server, in accordance with various embodiments.

A claimed solution rooted in computer technology overcomes problems specifically arising in the realm of computer technology. In various embodiments, a computing system is configured to access and obtain from a server resources needed to conduct an investigation remote from the server. Resources needed to conduct an investigation may include a portion of a database and/or one or more functionalities of a data analysis platform. Based on the investigation to be conducted (e.g., type of investigation, location of investigation, personnel involved, etc.), different amounts/types of resources may be obtained from the server. By obtaining a subset of resources from the server, the computing system is able to (1) conduct the investigation without any active connection with the server, and (2) maintain a compact database/application that is necessary to conduct the investigation. The investigation may be conducted via a web application that runs on the computing system. The web application may access the resources obtained from the server. The results of the investigation may be sent by the computing system to the server. The computing system may receive updates from the server. In some embodiments, the computing system may act as a server for other remote systems that are conducting investigations. The web applications running on the other remote systems may access the resources from the computing system. The results of the investigation may be send by the other remote systems to the computing system, which may then send the results to the server.

As used herein, the term "investigation" refers to a line of inquiry or analysis using a subset of a database provided by a server. The subset of the database is provided to a client device, and the client device (or another client device served by the client device) executes a data analysis platform that exposes the subset of the database. During an investigation, the data analysis platform may be used to explore different aspects of the subset of the database, make changes to the subset of the database, and/or create new records for the subset of the database. An investigation may be shared by multiple users—multiple users may collaborate on a single investigation via multiple client devices—or individual users may have their own separate investigations—individual users may work on individual investigations via individual client devices.

The invention disclosed herein enables users to conduct investigations in locations without an active network connection with a server that hosts the resources for conducting investigations. The invention enables a user to obtain a subset of resources from the server and use the subset of resources to conduct the investigation in locations without an active network connection with the server—i.e., in locations where a network connection to the server may be only periodically available, unreliable, or nonexistent. For example, emergency responders may be planning on conducting a search-and-rescue mission in a location where the geographic/terrain/weather (e.g., mountainous regions, underground tunnels, stormy conditions) interferes with an active network connection with the server and/or in areas where the network connection is unreliable (e.g., communication towers are inoperable/unreliable). The emergency responders may need access to specific data about the location to properly conduct their investigations. For example, the emergency responders may require access to terrain maps, aerial view maps, utility maps, population information, and/or other information about a location. Lack of active network connection with the server may prevent the emergency responders from having access to the data at mission critical times. By obtaining the subset of resources necessary from the server and storing them in a client device, the user is able to conduct the investigation without an active network connection with the server.

The emergency responders may also need updated data about the location and/or to report back the results of the investigations. For example, emergency responders may require information about changes in weather patterns, operable access ways, and/or information gained by other emergency responders. The invention disclosed herein enables a client device to communicate with the server using a network protocol designed to allow for data transfers in locations where the network connection to the server is only periodically available or unreliable. For example, a client device may be communicating with a server via a satellite communication link which has high bandwidth but also high latency. The network protocol provides for resilient communication that enables transfer of data in locations with poor network connection. The network protocol increases the opportunity for the client device and the server to communicate properly and increases the efficiency of the data sharing.

The invention disclosed herein further enables multiple users to conduct investigations through one or more client devices acting as mini-server(s). For example, a team of emergency responders may be working on individual investigations and/or collaborating on combined investigations. One or more client devices of the emergency responders may obtain needed resources from the server and act as a mini-server to other client devices. The mini-server client device(s) provides resources to other client devices as needed, and the team of emergency responders aggregate their investigation data through the mini-server client device(s), which communicates with the server when a network connection is available.

FIG. 1 illustrates an example environment 100 for conducting investigations while having limited network connectivity to a server, in accordance with various embodiments. The example environment 100 may include a server 110, a client A 120, and a client B 130. The server 110, the client A 120, and the client B 130 may include one or more processors and memory. The processor(s) may be configured to perform various operations by interpreting machine-readable instructions stored in the memory. The server 110 may communicate with the client A 120 and/or the client B 130 via a network 170. The environment 100 may also include a data store (not shown) that is accessible to the server 110 and/or one or more of the clients 120, 130 via the network 170. In some embodiments, the data store may include various databases, application functionalities, application/data packages, and/or other data that are available for download, installation, and/or execution.

In various embodiments, the server 110 may have access to resources required by investigation applications to facilitate investigations by one or more users. The server 110 may include a database 112, functionalities 114, a resource engine 116, and a communication engine 118. The database 112 may include a structured set of data that can be divided/extracted for provision when needed by a client device (e.g., client A 120, client B 130). The data stored in the database 112 may include raw data or processed data. For example, the database 112 may include raw data of aerial view maps of various locations and may include processed data of roadways, pathways, and/or emergency routes that may be overlaid over the aerial view maps. As another example, the database 112 may include raw data of weather information and may include processed information of predicted weather patterns. The functionalities 114 may include one or more functionalities for an investigation application using a subset of data from database 112 to facilitate an investigation. Functionalities for an investigation application may include different data analysis modules that allows the investigation application to perform different data analysis tasks, patches for the investigation application, custom application/functionalities built for particular investigations, administrative tasks to be executed by client devices 120, 130 and/or different permissions for the investigation application to change/operate on the data received from the database 112.

The resource engine 116 may be configured to determine one or more resources for an investigation to be performed remotely from the server 110. The resource engine 116 may select one or more data (e.g., a subset of data from database 112 or data store) and/or one or more functionalities (a subset of functionalities from functionalities 114 or data store) for an investigation based on the investigation to be conducted, based on a user interaction with server 110, based on a user interaction with a client device (e.g., client A 120, client B 130) and/or other information. The resource engine 116 may have preset and/or previously defined sets of data/functionalities for different types of investigations, different locations of investigations, and/or different personnel involved in the investigations. The resource engine 116 may enable a user operating through a terminal (coupled with the server 110 and/or a client device 120, 130) to select particular data and/or functionalities needed for an investigation. For example, the users may select a customized data set from database 112 based on a temporal and/or a geospatial filter, which enables the users to take the most relevant information for the investigation while reducing the size of the data set taken from database 112. Taking a subset of the database 112 may increase the speed and performance of the server 110, and client devices 120, 130 during investigations.

The resource engine 116 may create one or more resource packages from the data (e.g., a subset of data from database 112 or data store) and/or functionalities (a subset of functionalities from functionalities 114 or data store) selected for an investigation. The resource packages created by the resource engine 116 may include database/data analytics ontologies that may be used by the client devices 120, 130 during investigations. The resource engine 116 may include one or more updated data/functionalities in a resource package. For example, the resource engine 116 may have created an initial payload for the client A 120 to include a map of a region and/or information associated with the region. The map included in the resource package may be changed at a later time. For example, details may be added/removed from the map and/or one or more conditions (weather conditions) included with the map may change over time. Rather than including a new map with new information in the resource package, the resource engine 116 may include changes to the map in the resource package so that the client A 120 can locally incorporate the changes into the map. Including updates to previously sent data/functionalities, rather than including new data/functionalities, may reduce the size of the resource package to be sent to the client A 120. In some embodiments, the resource engine 116 may enable offline syncing (storage and transfer of resource packages via physical media) between the server 110 and client devices 120, 130.

In various embodiments, the server 110 and/or the client devices 120, 130 may allow for user-management of the data selected for an investigation. For example, data selected for an investigation may include a map cache (a collection of map tiles) of the location at which the investigation will be conducted. Users may use the server 110 and/or the client devices 120, 130 to manually create map caches of the relevant location before deployment so that the data about the location is stored locally within the client devices 120, 130. By storing the map tiles locally within the client devices 120, 130, a user may use the client devices 120, 130 to view the maps with little or no connection with the server 110. The users may change the map caches during the investigation by including more, less, and/or different information within the map caches.

The users may define one or more parameters of the map cache. The users may define the location(s) for which the map cache will be defined. The users may define the levels/types of details to be included in the map cache. For example, the users may define the zoom level of the maps and/or the types of information (e.g., information about roads, terrain, population) included in the maps. Individual map tiles may be associated with particular details. Different maps tiles may be associated with different zoom level and/or types of information so that the individual map tiles include the most relevant information and does not include unnecessarily information. For example, an emergency responder may wish to have emergency pathway information for a larger area of the investigation location while having utility access information for particular buildings. By restricting the utility access information to particular buildings (instead of all buildings in the investigation area), the size of the map cache may be reduced, enabling quicker transfer time between the server 110 and the client devices 120, 130. In some embodiments, the data selected for an investigation (e.g., map caches) may be stored at server 110 for reuse. In some embodiments, the data selected for an investigation may not be stored—for example, a one-time map cache may be created for inclusion in a resource package.

The communication engine 118 may be configured to send one or more resources for an investigation to a client device (e.g., the client A 120, the client B 130). The communication engine 118 may be configured to send one or more updates for one or more resources to a client device. The communication engine 118 may be configured to receive one or more results of an investigation from a client device. For example, the communication engine 118 may send resources and/or updates to resources to the client A 120 and/or the client B 130 by sending one or more resource packages discussed above. The communication engine 118 may send and/or receive data from a client device when the client device syncs with the server. For example, the server 110 may include one or more resource packages containing new map caches, updated map caches, software updates/patches, and/or other information for a client device. When the client device devices connect with the server 110 for a data sync, the communication engine 118 may send the resource package(s) to the client device for installation/use.

The communication engine 118 may receive results of an investigation from the client A 120 and/or the client B 130 and incorporate the results into the database 112. For example, the communication engine 118 may receive and incorporate changes to data stored in the database 112 and/or may receive and incorporate new records for inclusion in the database 112. In some embodiments, the communication engine 118 may receive operating information about the client devices (e.g., operation logs), which enables users of the server 110 to assist in solving issues with the client devices (e.g., writing/fixing mission-specific tools).

In some embodiments, the communication engine 118 may record full lineage and history of data as different users make changes to the data in the database 112 (e.g., via interaction with the data subset A-1 222A and/or the data subset A-2 222B). In some embodiments, the communication engine 118 may hide one or more lineage and/or history information when sharing the results of the investigation. For example, the communication engine 118 may utilize vector clocks to keep track of changes being made to data/objects stored in the database 112 (e.g., via interaction with the data subset A-1 222A and/or the data subset A-2 222B). The amount of data required to represent the vector clock may become very large/unwieldy as the number of client device served by server 110 (directly by server 110 and/or indirectly through another client device) increases. For example, the server 110 may have more than two dozen client devices serving as mini-servers, with each mini-servers serving hundreds of other client devices. The amount of data required to represent the changes made by individual client devices may be very large, which may slow down the transfer of data between the server 110 and the mini-servers and/or between the server 110 and other servers.

The server 110 may decrease the size of the vector clock information by hiding/excluding information about which client device made the particular change when sharing the vector clock information. This may result in the vector clock indicating that any changes made by client devices served by the server 110 (directly or indirectly) as being made by the server 110. Such process may be referred to as vector clock flattening. Vector clock flattening may effectively hide the individual client devices served by the server 110 behind the server 110. Vector clock flattening may enable servers to keeping track of and share changes in data based on a per-server basis rather than a per-client device basis. By using vector clock flattening, the server 110 may reduce the amount of data/time required to update other devices (e.g., servers, client devices) regarding changes to the data. The vector clock flattening may not be applied to changes for which the lineage/history information must be preserved.

In some embodiments, the communication engine 118 may utilize vector clock flattening during an import operation and/or an export operation. During an import operation (importing at the server 110 from the client devices 120, 130), for each incoming object, the server 110 may perform happens-after/concurrency checks with the full clock information, and either apply the objects or put them in pending. For each happens-after objects, the server 110 may create a local data event (to bump the clock), remove the client device-part of the clock (the server 110 may record this information in another location) and store the new non-client device clock. When deconflicting, the server 110 may perform a similar update to the clock without an extra data event bump (except in a value-equals deconfliction).

During an export operation (exporting from the server 110 to the client devices 120, 130), the server 110 may re-add the client-device part of the clock when exporting to the client devices 110, 120. This may avoid constant deconfliction. To determine which part of the client-device part to re-add, the server 110 may use a table that maps the local data event at which an object was imported to the part of the clock to re-add.

The communication engine 118 may implement a network protocol designed to allow for data transfers in locations where the network connection to the server is only periodically available or unreliable. In some implementations, the network protocol may enable the communication engine 118 to reroute communications between the server 110 and the client devices 120, 130. In some implementations, the communication engine 118 may provide for priority in communications (e.g., certain data/client devices are provided with higher priority for communication than other data/client devices).

The network protocol may make a number of assumption about the network connection. The assumptions about the network connection may include: (1) the server 110 and the client devices 120, 130 may have a network connection; (2) the network connection between the server 110 and the client devices 120, 130 may drop during transmission of data; (3) the data transmission between the server 110 and the client devices 120, 130 may resume—allows for resumption of partial data transfer. The network protocol may enable the devices (e.g., servers, client devices) to share data when connection becomes available (e.g., during syncing of data), rather than communicating on a periodic basis.

The network protocol implemented by the communication engine 118 may include a number of network connection settings designed to provide resilient communication that enables transfer of data in locations with poor network connection. The communication engine 118 may allow for user management of the network connection settings to fine-tune the connection between the server 110 and the client devices 120, 130. The network connection settings for the network protocol may include (1) connection timeout, (2) socket timeout, (3) retries, (4) retry interval, and (5) chunk size.

The connection timeout setting determines the time allotted to the client devices 120, 130 to initialize a new connection with the server 110. The default time allotted for connection timeout may include sixty seconds. The connection attempt will timeout if the client devices 120, 130 cannot communicate with the server 110 within the allotted time period. This may occur if the network connection between the server 110 and the client devices 120, 130 have dropped out completely or if the network connection is too slow. A high value for the connection timeout may cause overall communication failures to take a longer time to be reported.

The socket timeout setting determines the maximum amount of time an established connection between the client devices 120, 130 and the server 110 can remain "alive" without receiving or sending any data. The default time allotted for socket timeout may include sixty seconds. If the connection between the client devices 120, 130 and the server 110 drops during a data transfer, the client devices 120, 130 will wait for the time of the socket timeout before closing the connection and retrying.

The retry setting determines the number of times the client devices 120, 130 will attempt to connect to the server 110 before giving up. The retry counter may be initialized whenever there is an operation that requires connecting and transferring data to/from the server 110. The default value for the retry setting may be ten. On a slow or intermittent network that timeouts or drops connections frequently, the retry value may be increased to ensure complete data transfer. Upon a data transfer failure, the retry counter is incremented and the client devices 120, 130 may attempt to resume the transfer from the last successful point (attempting to resume partial data transfer) using sync markers. Sync markers may be set based on file size, and the server 110 and the client devices 120, 130 may send sync markers back and forth to indicate how much of the data was successfully sent. The data transmission may be accompanied by use of checksum to confirm the integrity of the received files.

The retry interval controls the amount of time to wait between retry attempts between the server 110 and the client devices 120, 130. The retry interval uses an exponential back-off technique to avoid flooding a congested network when connections are failing. When a connection or transfer attempt fails and a retry is attempted, an ATTEMPT_COUNTER value is incremented and the retry is held off for a wait amount given by: min(MAX_RETRY_INTERVAL, SERVER_RETRY_INTERVAL*(1.5^ATTEMPT_COUNTER)). MAX_RETRY_INTERVAL may define the maximum duration of the retry interval. SERVER_RETRY_INTERVAL may define the retry internal defined for a particular server. For example, the wait amounts for 10 retries, where the SERVER_RETRY_INTERVAL=0.1 second and MAX_RETRY_INTERVAL=5.0 second, are (in seconds): 0.15; 0.23; 0.34; 0.51; 0.76; 1.14; 1.71; 2.56; 3.84; 5.0. As another example, the wait amounts for 10 retries, where the SERVER_RETRY_INTERVAL=1.0 second and MAX_RETRY_INTERVAL=20.0 seconds, are (in seconds): 1.5; 2.25; 3.38; 5.06; 7.60; 11.39; 17.09; 20.0; 20.0; 20.0.

In some embodiments, the communication engine 118 may enable a user to change one or more network connection settings based on the current/expected network connection quality. For example, the optimal network connection settings may be different when operating in a strong, stable network connection environment versus when operating in a weak, unstable network connection environment. In some embodiments, the communication engine 118 may detect the quality of the network connection environment in which the devices are operating and switch between different profiles of the network connection settings based on the detected quality of the network connection environment.

When the communication engine 118 determines that a connection between the server 110 and the client devices 120, 130 is reestablished, the information (e.g., resources, updates) created while the devices were disconnected are packaged and sent to the client devices 120, 130. This process ensures that the users of the client devices 120, 130 are provided with the up-to-date information for their investigations.

In various embodiments, the client A 120 may include a data subset A-1 122A, a data subset A-2 122B, and a communication engine A 128. The client A 120 may include a data analysis platform that enables a user to utilize resources obtained from server 110 to conduct one or more investigations. The user may use an investigation application (e.g., a web application) that exposes the data obtained from the server 110 and locally stored at the client A 120 to conduct the investigations and provide inputs into the data/investigation. The use of the data obtained from the server 110 and locally stored at the client A 120 may enable one or users to conduct investigations without having an active network connection with the server 110. In some embodiments, the investigation application may be executed at the client A 120 (e.g., a user uses a web application from the client A 120 to conduct the investigation). In some embodiments, the investigation application may be executed at a client device served by the client A 120 (e.g., a user uses a web application from another client device to access the resources stored at the client A 120 and conduct the investigation). In some embodiments, the client A 120 may communicate with different servers as needed when changing locations.

The inputs provided by the users using the client A 120 may be synced back to the server 110. The users may use the investigation application to change the received data and/or make new records to be sent to the server 110 for incorporation into the database 112. In some embodiments, the scope of the use of the data by the users may be limited based on the types of users. For example, certain users may be provided with the capability to use the client A 120 to view the data received from the server 110. These users may not be provided with the capability to use the client A 120 to make change to the data or enter new records. Other users may be provided with the capability to use the client A 120 to make changes to the data received from the server 110 and/or make new records for incorporation into the database 112.

The communication engine A 128 may be configured to receive one or more resources (e.g., the data subset A-1 122A, the data subset A-2 122B) for an investigation from the server 110. The communication engine A 128 may be configured to receive one or more updates for one or more resources from the server 110. The communication engine A 128 may be configured to send one or more results of an investigation to the server 110. The results of an investigation may be sent during the investigation and/or after the investigation. For example, the communication engine A 128 may receive resources and/or updates to resources from the server 110 by receiving one or more resource packages discussed above.

The communication engine A 128 may send results of an investigation to the server 110, which may then be incorporated into the database 112. For example, the communication engine A 128 may send changes for incorporation into the database 112 and/or new records for inclusion in the database 112. In some embodiments, the communications engine A 128 may send operating information about the client A 120 (e.g., operation logs), which may enable users of the server 110 to assist in solving issues with the client A 120 (e.g., writing/fixing mission-specific tools).

In some embodiments, the results of the investigation may be packaged in a periodic basis so that they are ready to be sent to the server 110 when a connection is established. In some embodiments, the results of the investigation may be packaged when a connection with the server 110 is detected. In some embodiments, the results of the investigation may be packaged based on a user command received at the client A 120 (e.g., through a user terminal coupled to client A 120 or a command to sync received from the server 110).

In some embodiments, the communication engine A 128 may hide one or more lineage and/or history information when sending the results of the investigation to the server 110. In some implementations, the communication engine A 128 may use vector clock flattening described above.

The communication engine A 128 may implement the network protocol described above to allow for data transfers in locations where the network connection to the server is only periodically available or unreliable. The communication engine A 128 may enable a user of client A 120 to change one or more network connection settings. The communication engine A 128 may enable a user of the client A 120 to change one or more of (1) connection timeout, (2) socket timeout, (3) retries, (4) retry interval, and (5) chunk size.

The data subset A-1 122A and the data subset A-2 122B may include one or more data needed for a user to conduct an investigation using the client A 120. The data subset A-1 122A and the data subset A-2 122B may include a subset of the database 112. The data subset A-1 122A and the data subset A-2 122B may include one or more of the same data from the database 112 and/or may include one or more of different data from the database 112. The data subset A-1 122A and the data subset A-2 122B may be used for the same investigation or for different investigations. The user may use the investigation application executed at the client A 120 to expose the data subset A-1 122A and/or the data subset A-2 122B. The user may user the investigation application executed at the client A 120 to conduct the investigation and provide inputs to the data/investigation without having an active network connection with the server 110.

In various embodiments, the client B 130 may include a data subset B-1 132, a functionality subset B-1 134, and a communication engine B 138. The client B 130 may include a data analysis platform that enables a user to utilize data obtained from server 110 to conduct one or more investigations. The user may use an investigation application (e.g., a web application) that exposes the data obtained from the server 110 and locally stored at the client B 130 to conduct the investigations and provide inputs into the data/investigation. The use of the data obtained from the server 110 and locally stored at the client B 130 may enable one or users to conduct investigations without having an active network connection with the server 110. In some embodiments, the investigation application may be executed at the client B 130 (e.g., a user uses a web application from the client B 130 to conduct the investigation). In some embodiments, the client B 130 may communicate with different servers as needed when changing locations.

The inputs provided by the users using the client B 130 may be synced back to the server 110. The users may use the investigation application to change the received data and/or make new records to be sent to the server 110 for incorporation into the database 112. In some embodiments, the scope of the use of the data by the users may be limited based on the types of users. For example, certain users may be provided with the capability to use the client B 130 to view the data received from the server 110. These users may not be provided with the capability to use the client B 130 to make change to the data or enter new records. Other users may be provided with the capability to use the client B 130 to make changes to the data received from the server 110 and/or make new records for incorporation into the database 112.

The communication engine B 138 may be configured to receive one or more resources (e.g., the data subset B-1 132, the functionality subset B-1 134) for an investigation from the server 110. The communication engine B 138 may be configured to receive one or more updates for one or more resources from the server 110. The communication engine B 138 may be configured to send one or more results of an investigation to the server 110. The communication engine B 138 may be configured to implement some, or all, of the functionalities of the communication engine A 128 as described above.

The data subset B-1 132 may include one or more data needed for a user to conduct an investigation using client B 130. The data subset B-1 132 may include a subset of the database 112. The user may use the investigation application executed at the client B 130 to expose the data subset B-1 132. The user may user the investigation application executed at the client B 130 to conduct the investigation and provide inputs to the data/investigation without having an active network connection with the server 110.

The functionality subset B-1 124 may include one or more functionalities for the investigation application using the data subset B-1 132. The functionality subset B-1 124 may include a subset of data analysis module, patches for the investigation application, custom applications/functionalities built for investigations, and/or permissions for the investigation application executed on the client B 130 and/or served by the client B 130 to change/operate on the data subset B-1 132.

For example, functionality subset B-1 134 may allow certain users (e.g., administrators) to create and run administrative tasks on the client B 130. As non-limiting example, administrative tasks may be run to collect diagnostics about the client B 130 to diagnose a problem with the client B 130, to fix or change a state that caused an issue at the client B 130 (such as an emergency configuration change), and/or to deploy emergency software updates for investigation applications or other components of the client B 130. In some embodiments, administrative tasks may be executed as a part of the normal payload received from the server 110 (e.g., as part of receiving resource packages/updates to resource package). In some embodiments, the administrative tasks may be executed by the client B after application of any pending patches but before data import. The results of the administrative tasks may be collected and saved on the client B 130. The results of the administrative tasks may be sent to the server 110 at the end of the administrative task or as part of another payload to the server 110. For example, the client B 130 may send to the server 110 the results of the administrative tasks along with the results of an investigation. The results of the administrative task may include a log, output files, metadata indicating operating of the administrative task, and/or other information.

Figure 2:
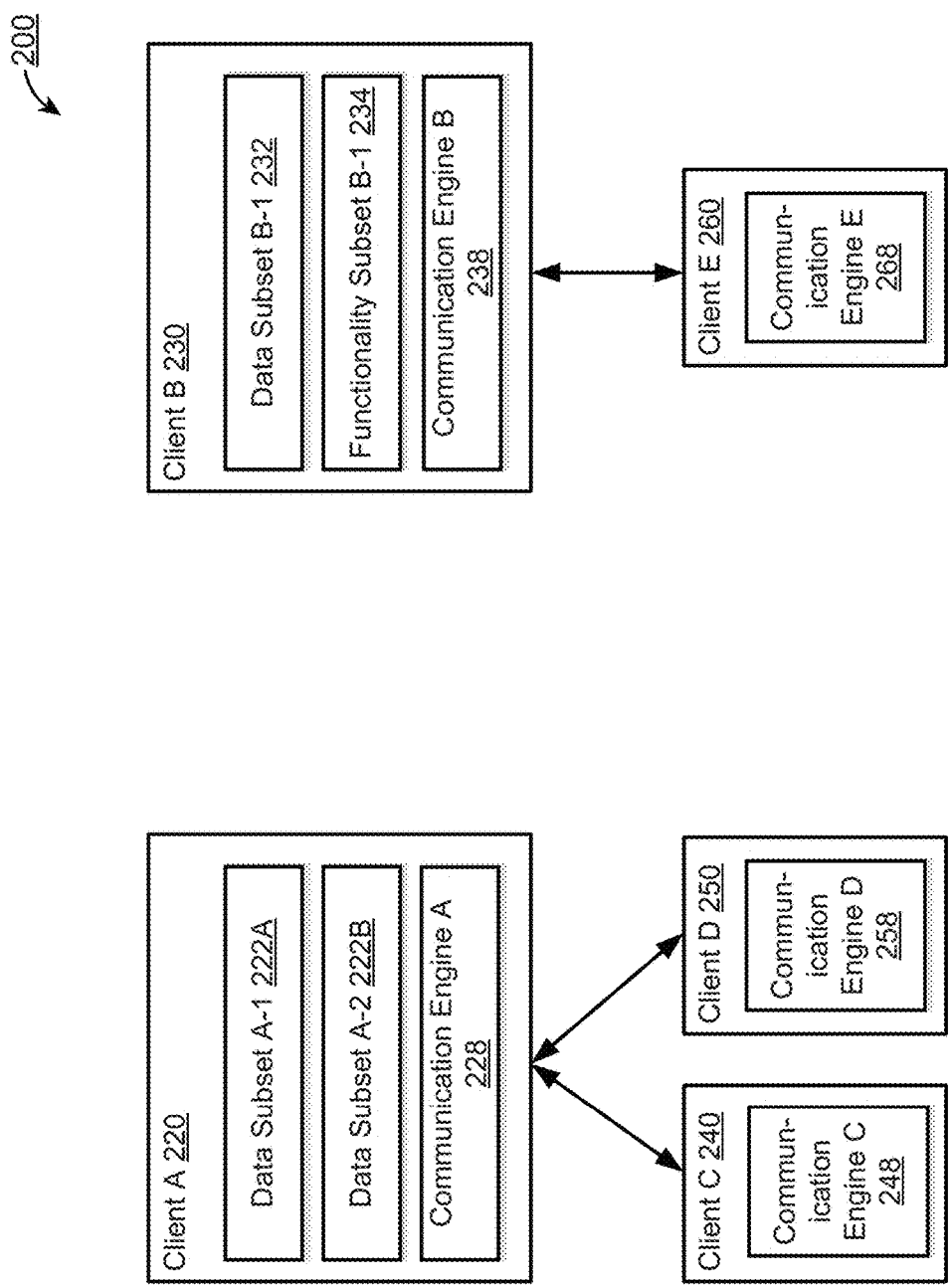

FIG. 2 illustrates an example environment 200 for conducting investigations while having limited network connectivity to a server, in accordance with various embodiments. The example environment 200 may include a client A 220, a client B 230, a client C 240, a client D 250, and a client E 260. The client A 220, the client B 230, the client C 240, the client D 250, and the client E 260 may include one or more processors and memory. The processor(s) may be configured to perform various operations by interpreting machine-readable instructions stored in the memory. In some embodiments, the client A 220 may be configured to implement some, or all, of the functionalities of the client A 120 as described above. Similarly, in some embodiments, the client B 230 may be configured to implement some, or all, of the functionalities of the client B 130 as described above. The client A 220, the client B 230, the client C 240, the client D 250, and the client E 260 may not have an active connection with a server ("base server") from which the clients 220, 230, 240, 250, 260 may receive resources necessary to conduct one or more investigations.

Prior to the example environment 200 shown in FIG. 2, the client A 220 may have received resources necessary to conduct one or more investigations (e.g., data subset A-1 222A, data subset A-2 222B) from a base server as described above with respect to the data subset A-1 122A, the data subset A-2 122B. In some embodiments, the communication engine A 228 may be configured to implement some, or all, of the functionalities of the communication engine A 128 as described above.

The communication engine A 228 may be configured to serve one or more resources from the data subset A-1 222A and/or the data subset A-2 222B to the client C 240 and/or the client D 250. The communication engine A 228 may be configured to receive one or more results of investigations from client C 240 and/or client D 250. The communication engine A 228 may be configured to provide one or more results of investigation received from the client C 240 and/or the client D 250 to another server (e.g., the base server).

The communication engine A 228 may enable the client A 220 to act as a server ("mini-server") for the resources contained in the data subset A-1 222A and/or the data subset A-2 222B. The communication engine A 228 may enable multiple users operating the client C 240 and the client D 250 to collaborate on the same data set (the data subset A-1 222A or the data subset A-2 222B) and/or work on independent investigations using separate data sets (the data subset A-1 222A and the data subset A-2 222B). For example, users using the client C 240 and the client D 250 may launch investigation applications using the client C 240 and the client D 250, respectively. The investigation applications may use the same or different map caches stored in the data subset A-1 222A and/or the data subset A-2 222B. In some embodiments, the communication engine A 228 may hide one or more lineage and/or history information when sending the results of the investigation to the base server. In some implementations, the communication engine A 228 may use vector clock flattening described above.

Referring to the client B 230 in FIG. 2, the client B 230 may have received resources necessary to conduct one or more investigations (e.g., the data subset B-1 232, the functionality subset B-1 234) from a base server as described above with respect to the data subset B-1 132, the functionality subset B-1 134. In some embodiments, the communication engine B 238 may be configured to implement some, or all, of the functionalities of the communication engine B 138 as described above.

The communication engine B 238 may be configured to serve one or more resources from the data subset B-1 232, the functionality subset B-1 234 to client E 260. The communication engine A 228 may be configured to receive one or more results of investigations from the client E 260. The communication engine B 238 may be configured to provide one or more results of investigation received from client E 260 to another server (e.g., the base server).

The communication engine B 238 may enable client B 230 to act as a mini-server for the resources contained the data subset B-1 234 and/or the functionality subset B-1 234. In some implementations, the communication engine B 238 may record full lineage and history of data as different users make changes to the data in data subset B-1 234. In some embodiments, the communication engine B 238 may hide one or more lineage and/or history information when sending the results of the investigation to the base server. In some implementations, the communication engine B 238 may use vector clock flattening described above.

The client C 240 may include the communication engine C 248. The communication engine C 248 may enable the client C 240 to communicate with the client A 220 as described above. The client D 250 may include the communication engine D 258. The communication engine D 258 may enable the client D 250 to communicate with the client A 220 as described above. The client E 260 may include the communication engine 268. The communication engine 268 may enable the client E 260 to communicate with the client B 230 as described above.

Figure 3:
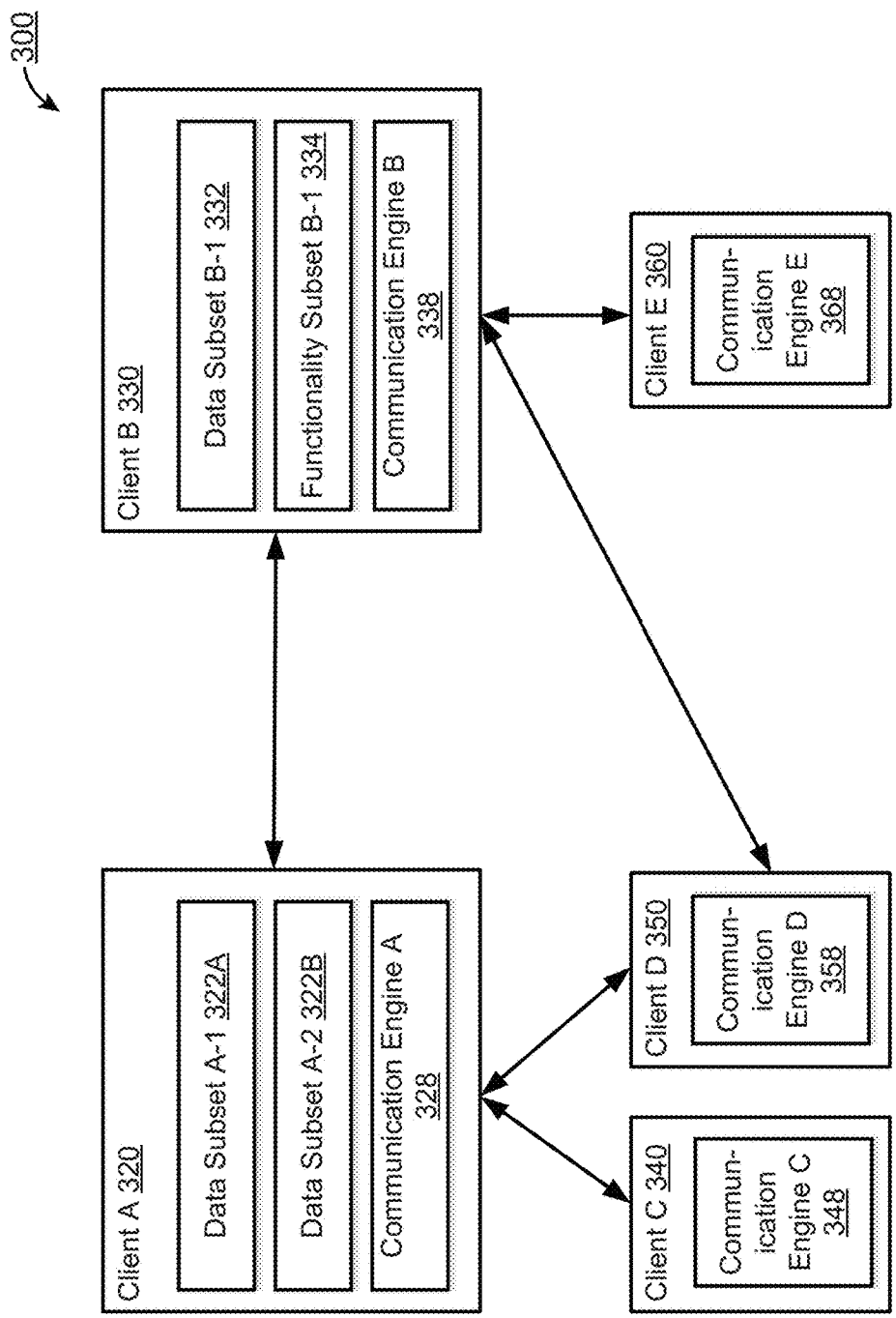

FIG. 3 illustrates an example environment 300 for conducting investigations while having limited network connectivity to a server, in accordance with various embodiments. The example environment 300 may include a client A 320, a client B 330, a client C 340, a client D 350, and a client E 360. The client A 320, the client B 330, the client C 340, the client D 350, and the client E 360 may include one or more processors and memory. The processor(s) may be configured to perform various operations by interpreting machine-readable instructions stored in the memory. In some embodiments, the client A 320 may be configured to implement some, or all, of the functionalities of the client A 120, 220 as described above. In some embodiments, the client B 330 may be configured to implement some, or all, of the functionalities of the client B 130, 230 as described above. In some embodiments, the client C 340, the client D 350, and the client E 360 may be configured to implement some, or all, of the functionalities of the client C 240, the client D 250, and the client E 260 as described above.

The client A 320, the client B 330, the client C 340, the client D 350, and the client E 360 may not have an active connection with a server ("base server") from which the clients 320, 330, 340, 350, 360 may receive resources necessary to conduct one or more investigations.

Prior to the example environment 300 shown in FIG. 3, the client A 320 may have received resources necessary to conduct one or more investigations (e.g., data subset A-1 322A, data subset A-2 322B) from a base server as described above with respect to the data subset A-1 122A, 222A, the data subset A-2 122B, 222B. In some embodiments, the communication engine A 328 may be configured to implement some, or all, of the functionalities of the communication engine A 128, 228 as described above. The client B 330 may have received resources necessary to conduct one or more investigations (e.g., the data subset B-1 332, the functionality subset B-1 334) from a base server as described above with respect to the data subset B-1 132, 232, the functionality subset B-1 134, 234. In some embodiments, the communication engine B 338 may be configured to implement some, or all, of the functionalities of the communication engine B 138, 238 as described above.

The client C 340 may include the communication engine C 348. The communication engine C 348 may enable the client C 340 to communicate with the client A 320 as described above. The client D 350 may include the communication engine D 358. The communication engine D 358 may enable the client D 350 to communicate with the client A 320 as described above. The client E 360 may include the communication engine 368. The communication engine 368 may enable the client E 360 to communicate with the client B 330 as described above.

In some embodiments, the ability of a mini-server (e.g., the client A 320, the client B 330) to provide resources locally stored within the mini-server to other client devices may be limited. For example, referring to FIG. 3, the client A 320 may be restricted from providing one or more resources contained in the data subset A-1 322A and/or the data subset A-2 322B to client devices other than the client C 340 or the client D 350. Restricting the devices to which a mini-server may provide resources for investigation may enable users to manage where the resources may be accessed and/or changed.

As another example, the client B 330 may be restricted from providing permanent copies of one or more resources contained in the data subset B-1 332 and/or the functionality subset B-1 334 to other client devices. The client B 330 may provide temporary copies of one or more resources contained in the data subset B-1 332 and/or the functionality subset B-1 334 to the client A 320, the client C 340, the client D 350, and/or the client E 360, allowing the client A 320, the client C 340, the client D 350, and/or the client E 360 to view and make changes to the resources during an active instance of the investigation application. The temporary copies of the resources provided by the client B 330 may be deleted after the users close the active instance of the investigation application or terminate connection with the client B 330. Restricting the client devices from receiving permanent copies of the resources may enable users to manage where the resources are stored and prevent wide/uncontrolled dissemination of the resources.

Figure 4:
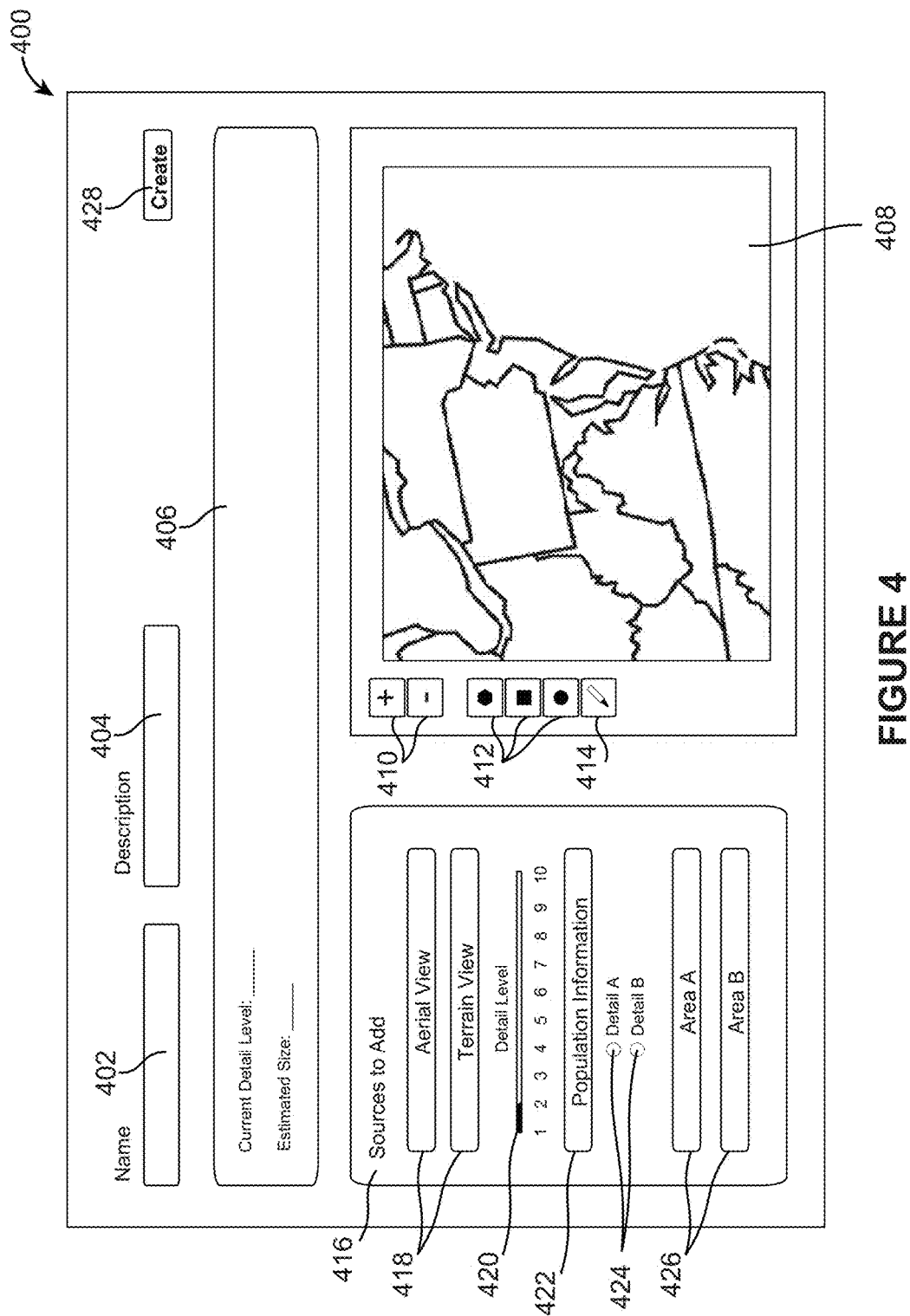
FIG. 4 illustrates an example interface for determining one or more resources for an investigation, in accordance with various embodiments.

FIG. 4 illustrates an example interface 400 for determining one or more resources for an investigation, in accordance with various embodiments. A user may use the interface 400 from a terminal (coupled with a base server, a mini-serer, or a client device) to select particular data and/or functionalities needed for an investigation. The interface 400 may include a name field 402, a description field 404, an information box 406, resources display 408, and sources to add box 416. A user may insert a name for a resource using the name field 402. A user may insert a description for a resource using the description field 404. The information box 406 may provide information about the selected resource. For example, as shown in FIG. 4, the information box 406 may provide information about the level of detail included in the selected resource and the estimated size of the selected resource.

The resources display 408 may display the selected resource. For example, as shown in FIG. 4, the resources display 408 may display a map from which a user may select the location to be included in the resource (e.g., map cache). The zoom level of the map displayed in the resources display 408 may be changed via interactions with options 410. A user may select the location to be included in the map cache by using one or more of options 412, 414. The option 412 may enable a user to select a shape to be overlaid of the map displayed in the resources display 408. For example, a user may select one or more of a hexagon, a square, a circle, and/or other shapes to be overlaid over the map. The size of the shape may be increased or decreased to cover different areas of the map. One or more shapes may be changed/distorted to cover different areas of the map. The areas inside the shape(s) may be included within the map cache. As another example, a user may select option 414 to draw one or more regions within the map. The areas inside the drawn shape(s) may be included within the map cache.

The sources to add box 416 may provide users with additional options for the type of information included within the map cache. For example, a user may use options 418 to determine what types of views (e.g., aerial view, terrain view) are included within the map cache. Option 420 may enable a user to determine the level of detail to be included within the map cache. For example, in FIG. 4, the user may have selected a detail level of "2," which includes more detail than the detail level of "1," but less details than the detail levels of "3" to "10" for the terrain view. Option 422 may enable a user to select a specific type of information to be include within the map cache. For example, the user may be provided with the options 424 to include different details about within the relevant location. Options 426 may enable a user to select a particular area (e.g., area A, area B) to be included within the map cache. The particular areas may be predefined areas or areas previously selected/defined by the user. The sources to add box 416 may include a date range selector by which a user may define the dates from which the information for the selected areas may be populated. The user may use the date range selector to define the dates of all information contained within the map cache or may use the date range selector to define different dates for different information contained within the map cache. For example, the user may use the date range selector to search and pull reports about a particular area published within a selected dates range. The user may use option 428 to create a map cache from the selected options.

The map tiles and additional information contained with map caches may be updated after the map caches have been provided to mini-servers. For example, a map cache may include aerial views of a building. After the map cache has been provided to a mini-server, the base server may be updated with more recent aerial views of the building. During a syncing session between the mini-server and the base server (e.g., during a data sync), the mini-server may receive from the base server newer aerial views of the building. In some embodiments, the users of the investigation applications that rely on the mini-server for information on the building may be provided with a message that an updated aerial views of the building is available.

Figure 5:
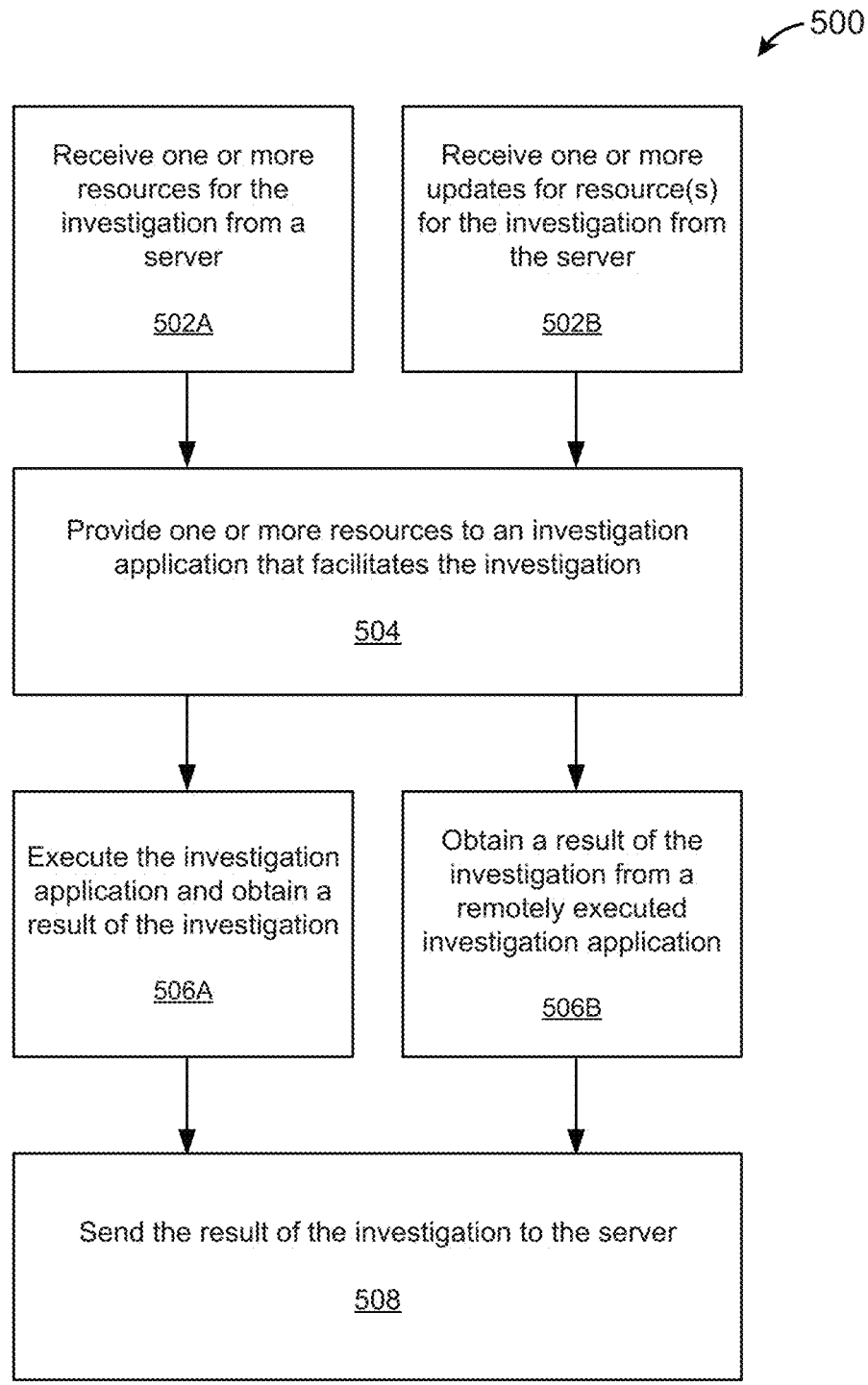
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502A, one or more resources for an investigation to be performed remotely from a server may be received from the server. At block 502B, one or more updates for resource(s) for the investigation may be received from the server. At block 504, one or more resources may be provided to an investigation application that facilitates the investigation. One or more provided resources may enable the investigation application to facilitate the investigation without an active connection to the server. At block 506A, the investigation application may be executed and a result of the investigation may be obtained from the investigation application. At block 506B, a result of the investigation may be obtained from a remotely executed investigation application. At block 508, the result of the investigation may be sent to the server.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
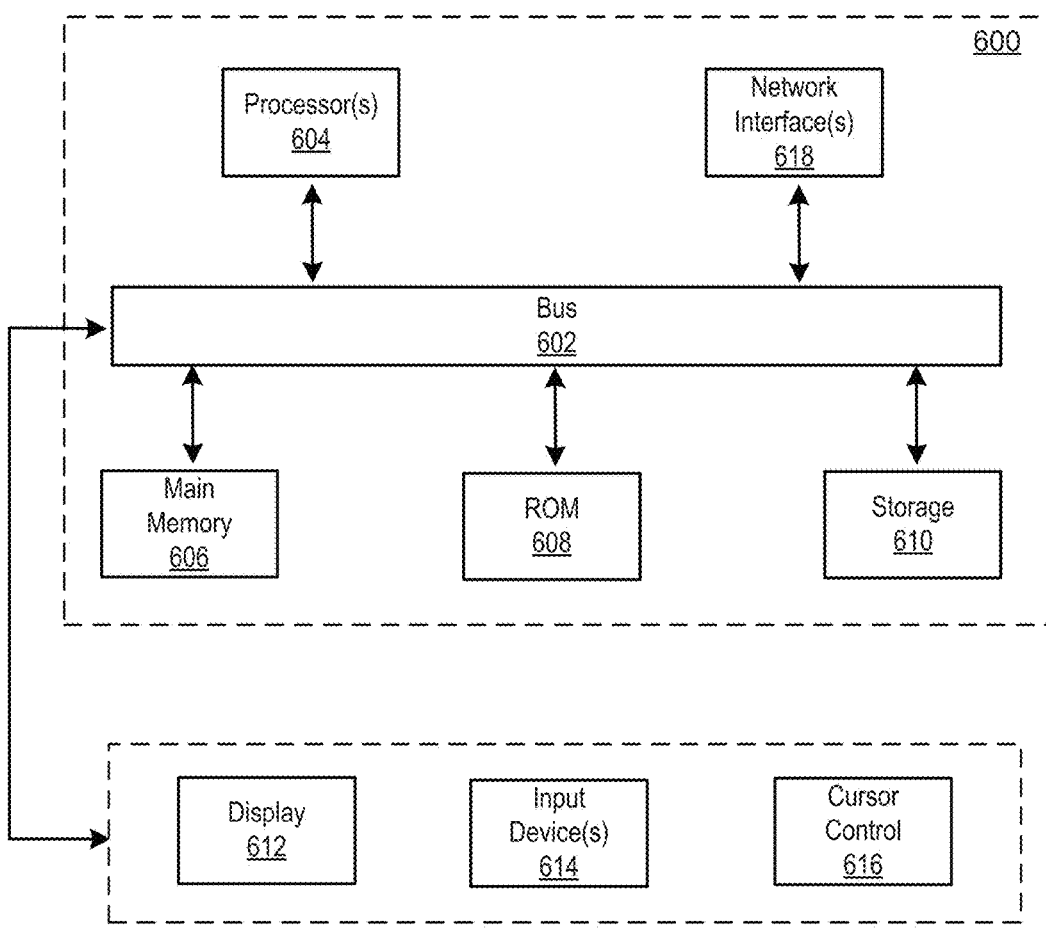
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604.

Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A server system comprising:
one or more processors; and
memory storing instructions that, when executed by the one or more processors, cause the server system to perform:
determining one or more resources for an investigation to be performed remotely from the server system;
providing the one or more resources to a first client device, the first client device being a client of the server system; and
receiving a first result of the investigation from the first client device, the first result of the investigation being determined by the first client device based on an aggregation of a second result of the investigation and a third result of the investigation, the second result of the investigation being determined, based on the one or more resources, by a first investigation application executed on a second client device, the third result of the investigation being determined, based on the one or more resources, by a second investigation application executed on a third client device, the second and third client devices being clients of the first client device, the one or more resources enabling the first investigation application and the second investigation application to facilitate the investigation without an active connection between the server system and the first client device, the first result of the investigation being provided from the first client device to the server system in response to an active connection being detected between the first client device and the server system.

2. The system of claim 1, wherein the one or more resources include a subset of a database accessed by the server system.

3. The system of claim 1, wherein the one or more resources are provided to the first client device using a first communication protocol.

4. The system of claim 3, wherein the first result of the investigation is received from the first client device using the first communication protocol.

5. The system of claim 3, wherein the third result of the investigation is received by the first client device from the second client device using a second communication protocol, the second communication protocol being different from the first communication protocol.

6. The system of claim 1, wherein the instructions further cause the server system to perform providing one or more updates for the one or more resources.

7. The system of claim 1, wherein the first result of the investigation is determined without an active connection between the first client device and the server system.

8. A method implemented by a computing system including one or more processors and storage media storing machine-readable instructions, wherein the method is performed using the one or more processors, the method comprising:
determining, by a server system, one or more resources for an investigation to be performed remotely from the server system;
providing, by the server system, the one or more resources to a first client device, the first client device being a client of the server system; and
receiving, by the server system, a first result of the investigation from the first client device, the first result of the investigation being determined by the first client device based on an aggregation of a second result of the investigation and a third result of the investigation, the second result of the investigation being determined, based on the one or more resources, by a first investigation application executed on a second client device, the third result of the investigation being determined, based on the one or more resources, by a second investigation application executed on a third client device, the second and third client devices being clients of the first client device, the one or more resources enabling the first investigation application and the second investigation application to facilitate the investigation without an active connection between the server system and the first client device, the first result of the investigation being provided from the first client device to the server system in response to an active connection being detected between the first client device and the server system.

9. The method of claim 8, wherein the one or more resources include a subset of a database accessed by the server system.

10. The method of claim 8, wherein the one or more resources are provided to the first client device using a first communication protocol.

11. The method of claim 10, wherein the first result of the investigation is received from the first client device using the first communication protocol.

12. The method of claim 10, wherein the third result of the investigation is received by the first client device from the second client device using a second communication protocol, the second communication protocol being different from the first communication protocol.

13. The method of claim 8, further comprising providing one or more updates for the one or more resources.

14. The method of claim 8, wherein the first result of the investigation is determined without an active connection between the first client device and the server system.

15. A non-transitory computer readable medium comprising instructions that, when executed, cause one or more processors to perform:
   determining, by a server system, one or more resources for an investigation to be performed remotely from the server system;
   providing, by the server system, the one or more resources to a first client device, the first client device being a client of the server system; and
   receiving, by the server system, a first result of the investigation from the first client device, the first result of the investigation being determined by the first client device based on an aggregation of a second result of the investigation and a third result of the investigation, the second result of the investigation being determined, based on the one or more resources, by a first investigation application executed on a second client device, the third result of the investigation being determined, based on the one or more resources, by a second investigation application executed on a third client device, the second and third client devices being clients of the first client device, the one or more resources enabling the first investigation application and the second investigation application to facilitate the investigation without an active connection between the server system and the first client device, the first result of the investigation being provided from the first client device to the server system in response to an active connection being detected between the first client device and the server system.

16. The non-transitory computer readable medium of claim 8, wherein the one or more resources are provided to the first client device using a first communication protocol.

17. The non-transitory computer readable medium of claim 16, wherein the first result of the investigation is received from the first client device using the first communication protocol.

18. The non-transitory computer readable medium of claim 16, wherein the third result of the investigation is received by the first client device from the second client device using a second communication protocol, the second communication protocol being different from the first communication protocol.

* * * * *